US011566917B2

(12) United States Patent
Sechi et al.

(10) Patent No.: US 11,566,917 B2
(45) Date of Patent: Jan. 31, 2023

(54) SINGLE-TRACK MAGNETIC ENCODING

(71) Applicant: SRI International, Menlo Park, CA (US)

(72) Inventors: Paolo Sechi, Woodside, CA (US); Alan Leong, San Francisco, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 17/284,312

(22) PCT Filed: Oct. 9, 2019

(86) PCT No.: PCT/US2019/055380
§ 371 (c)(1),
(2) Date: Apr. 9, 2021

(87) PCT Pub. No.: WO2020/076937
PCT Pub. Date: Apr. 16, 2020

(65) Prior Publication Data
US 2021/0364323 A1   Nov. 25, 2021

Related U.S. Application Data (60) Provisional application No. 62/743,991, filed on Oct. 10, 2018.

(51) Int. Cl.
   *G01D 5/14*   (2006.01)
(52) U.S. Cl.
   CPC .................................. *G01D 5/14* (2013.01)
(58) Field of Classification Search
   CPC .......................................................... G01D 5/14
   See application file for complete search history.

(56) References Cited

U.S. PATENT DOCUMENTS 6,704,156 B1 * 3/2004 Baker ................ G11B 5/59633
                                                        360/75
6,989,669 B2   1/2006 Low et al.
(Continued)

FOREIGN PATENT DOCUMENTS

CN        101287978 A      10/2008

OTHER PUBLICATIONS

Tannous et al., "Magnetic Information-Storage Materials," Chapter 49 from Springer Handbook of Electronic and Photonic Materials, Oct. 2017, pp. 1185-1223.
(Continued)

*Primary Examiner* — Walter L Lindsay, Jr.
*Assistant Examiner* — Milton Gonzalez
(74) *Attorney, Agent, or Firm* — Shumaker & Sieffert, P.A.

(57) ABSTRACT

A system includes a substrate, a first and a second magnetic field sensor, and a computing device communicatively coupled to the first and second magnetic field sensors. The substrate has a surface encoded with a magnetic pattern sequenced along a direction of movement of the substrate. The magnetic pattern includes a data pattern that indicates a position of the substrate along the direction of movement and a clock pattern interleaved and substantially colinear with the data pattern that indicates a plurality of clock transitions. The computing device is configured to receive, from the first and second magnetic field sensors positioned above the magnetic pattern, a plurality of magnetic field signals detected from the magnetic pattern. The computing device is configured to determine, based on the plurality of magnetic field signals, the position of the substrate and output the position of the substrate.

25 Claims, 6 Drawing Sheets

(56) References Cited

U.S. PATENT DOCUMENTS

| | | |
|---|---|---|
| 7,034,527 B2 | 4/2006 | Low et al. |
| 7,259,553 B2 | 8/2007 | Arns, Jr. et al. |
| 7,307,418 B2 | 12/2007 | Low et al. |
| 7,439,733 B2 | 10/2008 | Arns, Jr. et al. |
| 7,737,685 B2 | 6/2010 | Low et al. |
| 7,755,350 B2 | 7/2010 | Arns, Jr. et al. |
| 8,432,638 B2 | 4/2013 | Sechi |
| 8,468,898 B2 | 6/2013 | Baller et al. |
| 8,970,208 B2 | 3/2015 | Fulkerson et al. |
| 9,503,676 B2 * | 11/2016 | Miyashita ............ H04N 5/7826 |
| 2009/0219122 A1 | 9/2009 | May |

OTHER PUBLICATIONS

International Search Report and Written Opinion of International Application No. PCT/US2019/055380, dated Jan. 10, 2020, 18 pp.
International Preliminary Report on Patentability from International Application No. PCT/US2019/055380, dated Apr. 22, 2021, 7 pp.

* cited by examiner

SINGLE-TRACK MAGNETIC ENCODING

This application is a national stage entry of WO International Patent Application No. PCT/US2019/055380, filed Oct. 9, 2019, which claims the benefit of U.S. Provisional Patent Application No. 62/743,991, filed Oct. 10, 2018, the entire contents of each of which are incorporated by reference.

TECHNICAL FIELD

The disclosure relates to magnetic encoding systems and techniques.

BACKGROUND

Many industrial and mobile applications use hydraulic or pneumatic cylinders and rotating members to control the movement and position of machinery. Precise control of a piston's position within a cylinder or a shaft's position in a stator is often fundamental to controlling the machinery's operation. Accordingly, various mechanical, magnetic, acoustic, and optical techniques may be used to detect an instantaneous position of a moving piston or shaft with respect to the cylinder or stator. One technique for detecting an instantaneous position involves magnetically encoding information in a material of the piston rod or shaft. Typically, the substrate of the piston rod or shaft is made of a ferromagnetic material, such as steel, or a non-ferromagnetic material, such as aluminum. A magnetic layer can be added on top of the substrate and magnetized. To measure an absolute position of a piston rod or shaft, the rod or shaft may include a data track that includes a sequence of detectable and undetectable elements encoded in the data track and a clock track with regularly spaced elements that is separate from the data track. Elements of the data track may directly correspond to elements of the clock track, such that undetectable elements of the data track may be identified based on detection of a corresponding element of the clock track. To accurately decode the encoded data track, the sensors on the two tracks are well aligned relative to each other and the elements on the two encoded tracks.

SUMMARY

In general, this disclosure describes techniques for magnetically encoding a single track onto a substrate for measurement of a position, and parameters derived from the position, of the substrate. For example, a substrate may be encoded with a magnetic pattern that includes a data pattern that indicates a position of the substrate and a clock pattern that indicates regular clock transitions. However, the clock pattern is interleaved with and colinear to, rather than separate from, the data pattern. Magnetic field sensors are positioned above the magnetic pattern such that, for each clock transition, at least one of the magnetic field sensors detects a magnetically recorded clock transition and another of the magnetic field sensors either detects a magnetically recorded transition corresponding to a first value or fails to detect (i.e. detects an absence of) a magnetically recorded transition corresponding to a second value. In this way, the clock transition provides a regular reference for each transition, or absence of a transition, of the data pattern during relative movement of the substrate and the magnetic field sensors. A computing device receives the magnetic field signals from the magnetic field sensors and decodes a portion of the data pattern, which may be unique to a particular position of the substrate, to determine the particular position of the substrate. In this way, position measurement systems using the disclosed techniques may determine the position of the substrate with less complex alignment and less constrained motion than position measurement systems that do not use a single track with interleaved clock elements.

In one example, a system as described herein includes a substrate, a first magnetic field sensor, and second magnetic field sensor, and a computing device. The substrate has a surface encoded with a magnetic pattern sequenced along a direction of movement of the substrate. The magnetic pattern includes a data pattern and a clock pattern interleaved and substantially colinear with the data pattern. The data pattern indicates a position of the substrate along the direction of movement. The clock pattern indicates a plurality of clock transitions. The first magnetic field sensor and the second magnetic field sensor are positioned above the magnetic pattern. The computing device is communicatively coupled to the first and second magnetic field sensors and configured to receive, from the first and second magnetic field sensors, a plurality of magnetic field signals detected from the magnetic pattern. The computing device is configured to determine, based on the plurality of magnetic field signals, the position of the substrate and output the position of the substrate.

In another example, a method for determining a position of a substrate along a direction of movement of the substrate as described herein includes receiving, by a computing device and from a first magnetic field sensor and a second magnetic field sensor positioned above a surface of the substrate, a plurality of magnetic field signals detected from the magnetic pattern. The surface is encoded with a magnetic pattern sequenced along the direction of movement of the substrate. The magnetic pattern includes a data pattern and a clock pattern interleaved and substantially colinear with the data pattern. The data pattern indicates a position of the substrate along the direction of movement. The clock pattern indicates a plurality of clock transitions. The method includes determining, by the computing device and based on the plurality of magnetic field signals, the position of the substrate and outputting, by the computing device, the position of the substrate.

In another example, a method for indicating a position of a substrate along a direction of movement of the substrate as discussed herein includes encoding, by a computing device, a surface of the substrate with a magnetic pattern. The magnetic pattern includes a data pattern and a clock pattern interleaved and substantially colinear with the data pattern. The data pattern indicates the position of the substrate along the direction of movement of the substrate. The clock pattern indicates a plurality of clock transitions.

The details of one or more examples are set forth in the accompanying drawings and the description below. Other features, objects, and advantages of the disclosure will be apparent from the description and drawings, and from the claims.

DETAILED DESCRIPTION

Figure 1A:
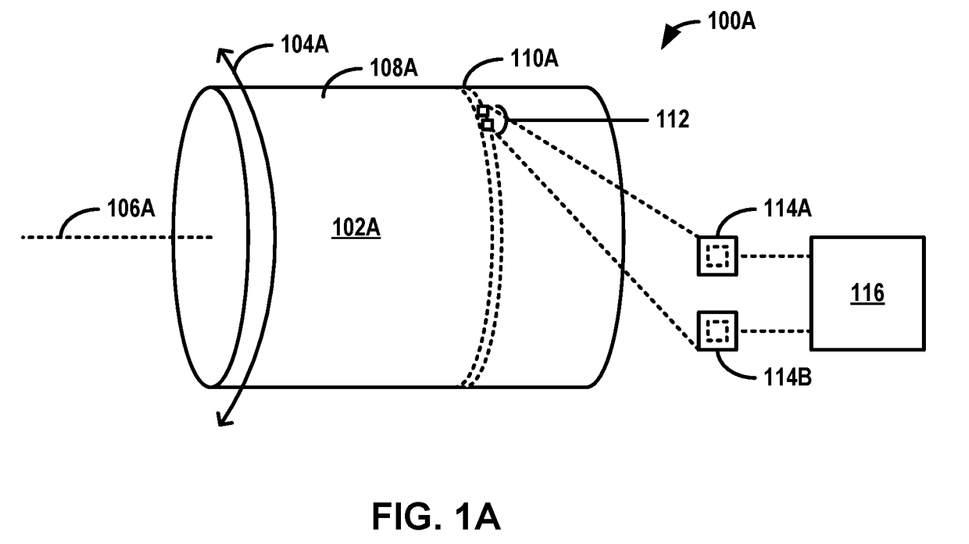
FIG. 1A is a conceptual perspective view diagram illustrating an example position measurement system for a rotating shaft, in accordance with examples discussed herein.

FIG. 1A is a conceptual perspective view diagram illustrating an example position measurement system 100A for measuring a circumferential position of a rotating substrate 102A, in accordance with examples discussed herein. In the example of FIG. 1A, substrate 102A is illustrated as an elongated cylindrical member configured to rotate along a direction of movement 104A around an axis 106A. In some examples, substrate 102A may be configured to transfer power through torque from a drive source to a point of application. For example, substrate 102A may be a shaft rotated by a motor at one end and coupled to a machine being driven by the shaft at another end. As another example, substrate 102A may be a shaft rotated by the blades of a wind turbine at one end and coupled to an electricity generator at another end. In such examples, a position of substrate 102A around axis 106A may indicate an operating parameter of the drive source or point of application, such as revolutions per minute (rpm) of the motor. Substrate 102A includes a surface 108A encoded with a magnetic pattern 110A sequenced along direction of movement 104A of substrate 102A. Magnetic pattern 110A may be positioned on substrate 102A such that magnetic pattern 110A is aligned under a single point as substrate 102A rotates around axis 106A. Magnetic pattern 110A may partially or fully encircle substrate 102A, such that alignment of substrate 102A may be unconstrained.

Figure 1B:
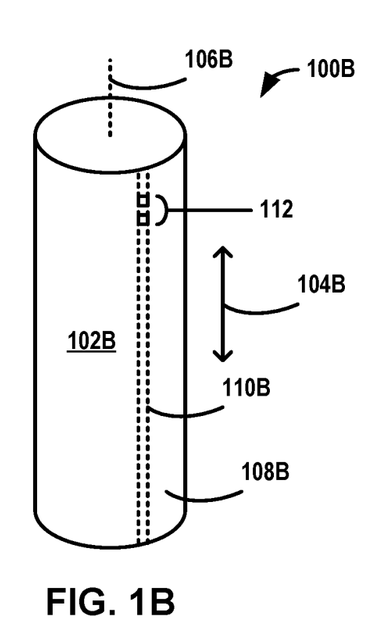
FIG. 1B is a conceptual perspective view diagram illustrating an example position measurement system for a linear shaft, in accordance with examples discussed herein.

FIG. 1B is a conceptual perspective view diagram illustrating an example position measurement system 100B for measuring an axial position of a linearly translating substrate 102B, in accordance with examples discussed herein. In the example of FIG. 1B, substrate 102B is illustrated as an elongated cylindrical member configured to move along a direction of movement 104B parallel to an axis 106B. In some examples, substrate 102B may be configured to transfer power through linear force from a drive source to a point of application. For example, substrate 102B may be a rod displaced by a hydraulic cylinder at one end and coupled to a machine being driven at another end. In such examples, a position of substrate 102B may indicate an operating parameter of the drive source or point of application, such as displacement of the cylinder. Substrate 102B includes a surface 108B encoded with a magnetic pattern 110B sequenced along direction of movement 104B of substrate 102B. Magnetic pattern 110B may be positioned on substrate 102B such that magnetic pattern 110B is aligned under a single point as substrate 102B moves along axis 106B. In examples in which substrate 102B is a linearly translating member, magnetic pattern 110B may partially or fully run along substrate 102B.

Although described with respect to elongated cylindrical members, the principles described herein can also apply to objects of other shapes, such as a plate, box, sphere, bar, strip, etc. Substrates 102A and 102B (referred to individually as "substrate 102" and collectively as "substrates 102") may include any moving component or portion of a component for which movement may be constrained (e.g., a piston) or cyclical (e.g., a rotating shaft), such as linear or rotational movement. Substrates 102 may be manufactured from a variety of materials and in a variety of configurations including, but not limited to solid members, hollow members, ferromagnetic materials (e.g., steel), non-magnetic materials (e.g., plastic, aluminum, ceramic, or glass), and the like.

Regarding FIGS. 1A and 1B, each magnetic pattern 110A and 110B (referred to individually as "magnetic pattern 110" and collectively as "magnetic patterns 110") includes a magnetic storage medium made from a magnetizable material that forms a non-volatile memory for storing magnetically recorded data. In some examples, the magnetizable material is magnetically "hard," having high coercivity, while in other examples, the magnetizable material may be magnetically "soft," having low coercivity. Magnetizable material of high coercivity may require considerable energy to magnetize (i.e., to record data), but also to demagnetize (i.e., to delete data), recorded information.

In some examples, magnetic pattern 110 may be encoded into a magnetizable material configured to adhere to surface 108. For example, substrate 102 may not be magnetizable, may be magnetically "soft," or may be positioned in an environment in which access to and/or encoding on substrate 102 may be difficult. Rather than replace substrate 102 with a different material or encode a less precise magnetic pattern, magnetic pattern 110 may be encoded onto a separate magnetizable material. In some non-limiting examples, magnetic pattern 110 may include thin alloy strips attached to substrate 102 at predefined locations. For example, using magnetic recording techniques, magnetic pattern 110 may be encoded onto an alloy strip. In some other non-limiting examples, each alloy strip may be magnetically recorded with magnetic pattern 110 prior to attachment of the alloy strip to substrate 102, while in other examples, the alloy strip may be magnetically recorded after attachment to substrate 102. Such magnetic strips may be coupled to surface 108 using adhesives, glues, pastes, cements, epoxy resins, bonding agents or other suitable means, such as hardware fasteners. In some examples, these magnetizable strips may be made of steel that is plated with a Co-based magnetic material. In this way, magnetic pattern 110 may be disposed on a variety of substrates 102 made of a variety of materials.

In some examples, magnetic pattern 110 can be encoded into a magnetizable material formed integrally in a magnetically hard layer at surface 108 of substrate 102. The magnetically hard layer may be continuous, extending continuously across surface 108, or be discontinuous and only as wide as or slightly wider than magnetic pattern 110. Techniques for forming a magnetically hard layer on a member, recording a magnetic pattern in the magnetically hard layer, and using the magnetic pattern to measure displacement may be found in U.S. Pat. No. 6,989,669, issued Jan. 24, 2006, and in U.S. Pat. No. 7,259,553, issued Aug. 21, 2007, the entireties of which are incorporated by reference herein. In some examples, substrate 102 may be magnetically recorded with magnetic pattern 110 during the manufacture of substrate 102, while in other examples, substrate 102 may be magnetically recorded with magnetic pattern 110 after manufacture, such as at a location in which substrate 102 may be used or integrated into another component.

Magnetic pattern 110 includes a plurality of magnetically recorded transitions. The plurality of magnetically recorded transitions may have a variety of orientations resulting from magnetic recording of magnetic pattern 110 that includes longitudinal magnetization and/or perpendicular magnetization. In longitudinal magnetization, magnetization lies in the plane of the medium, such that the magnetically recorded transitions may include head-to-head transitions of the in-plane magnetization from one polarity to the other. In perpendicular magnetization, magnetization is perpendicular to the plane of the medium, such that the magnetically recorded transitions may include side-by-side transitions between regions magnetized "up" and "down" from one polarity to the other. The magnetically recorded transitions in magnetic pattern 110 have a variety of spacings, as will be described in FIG. 1E below. In some examples, position measurement systems 100 may be configured to detect a position at a resolution lower than the spacings between magnetically recorded transitions. For example, position measurement systems 100 may further analyze a shape of magnetic field signals corresponding to the magnetically recorded transitions to detect micron-level displacement of substrate 102 for magnetically recorded transitions having one millimeter spacing.

In a two-track design, for elements of the data track to correspond to elements of the clock track, alignment of each of the two tracks with the respective read heads and cross-track alignment of the read heads must be maintained. However, manufacture and installation of multiple sensors with a high level of alignment can be challenging, as the sensors may be positioned at physically separate locations that are difficult to accurately space and align. Further, even if the rotational motion of a cylinder rod or shaft can be constrained to permit adequate alignment, encoding the rod requires knowledge of the final installation orientation of the hydraulic cylinder or stator, which may limit the general applicability of the cylinder or motor.

In contrast, magnetic pattern 110 includes both a data pattern and a clock pattern. The clock pattern is interleaved and substantially colinear with the data pattern in a single track. The data pattern is configured to indicate a position of substrate 102 along direction of movement 104. For example, the data pattern may include a maximum length sequence (m-sequence) of values that are indicated by the plurality of magnetically recorded transitions. Each portion of the sequence of values may be unique (e.g., unrepeated) within the data pattern, such that a particular portion of the sequence of values may indicate a particular position in magnetic pattern 110 and, correspondingly, on substrate 102. The values of the data pattern that are indicated by the plurality of magnetically recorded transitions may correspond to either a presence (e.g., a "1") or an absence (e.g., a "0") of a magnetically recorded transition. The clock pattern indicates a plurality of clock transitions. To detect an absence of a magnetically recorded transition, the clock pattern may provide regularly spaced clock transitions for use as a reference and to indicate motion of substrate 102. Magnetic pattern 110 will described further in FIG. 1E.

System 100 includes a magnetic field measurement apparatus 112. As illustrated in FIG. 1A, magnetic field measurement apparatus 112 includes one or more magnetic field sensors 114 positioned above magnetic pattern 110. In the example of FIG. 1A, system 100 includes a first magnetic field sensor 114A and a second magnetic field sensor 114B (referred to individually as "magnetic field sensor 114" and collectively as "magnetic field sensors 114") positioned above magnetic pattern 110; however, in other examples, more than two magnetic field sensors 114 may be used. Each magnetic field sensor 114 may be configured to read (e.g., detect magnetically recorded transitions of) magnetic pattern 110 recorded on substrate 102 as, for example, substrate 102A rotates about axis 106A or substrate 102B moves along axis 106B. Magnetic field sensors 114 may include a variety of magnetic field sensors including, but not limited to, GMR sensors, Hall-effect sensors, and the like. Magnetic field sensors 114 may output the detection of magnetically recorded transitions as magnetic field signals, such as to computing device 116.

System 100 includes a computing device 116. Computing device 116 is communicatively coupled to first magnetic field sensor 114A and second magnetic field sensor 114B and configured to collect and process magnetic field signals produced by magnetic field sensors 114 in response to a respective magnetic field sensor 114 detecting a magnetically recorded transition on magnetic pattern 110. From these magnetic field signals, computing device 116 may be configured to determine measurements of various parameters of substrate 102 related to positions, or changes in positions, of substrate 102 including, but not limited to, position, linear and rotational velocity and acceleration, angular displacement, static and dynamic torque, and vibration. Further operation of computing device 116 will be explained in further detail with reference to FIG. 1E below.

In some examples, computing device 116 is implemented in circuitry, such as via one or more processors and memory. Computing device 116 may include a variety of processing components including, but not limited to, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. Memory may comprise one or more storage devices. One or more components of computing device 116 (e.g., processors, memory, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. The one or more processors of computing device 116 may implement functionality and/or execute instructions associated with computing device 116. Examples of processors include microprocessors, application processors, display controllers, auxiliary processors, one or more sensor hubs, and any other hardware configured to function as a processor, a processing unit, or a processing device. Computing device 116 may use one or more processors to perform operations in accordance with one or more aspects of the present disclosure using software, hardware, firmware, or a mixture of hardware, software, and firmware residing in and/or executing at computing device 116. The one or more storage devices of memory may be distributed among multiple devices. Computing device 116 may be an edge device, part of a control system for machinery, a cloud-based server in communication with magnetic field sensors 114, or other computing device.

In some examples, computing device 116 may further include signal processing equipment including analog processing equipment, digital processing equipment, and the like. For example, computing device 116 may include one or more amplifiers configured to process position measurement signals from read heads 118, one or more analog-to-digital converters configured to generate a digital signal from analog measurement signals from read heads 118 or amplifiers, and a variety of other equipment configured to condition position measurement signals for further processing by computing device 116.

Figure 1C:
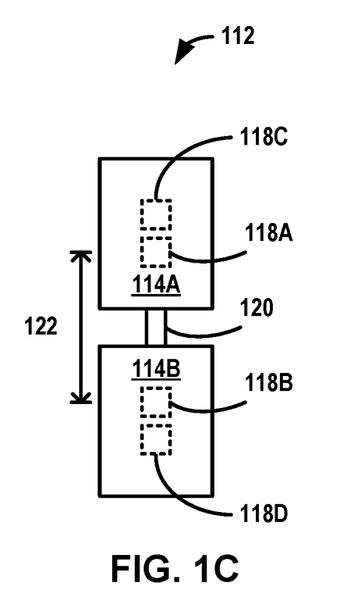
FIG. 1C is a conceptual perspective top view diagram illustrating an example magnetic field measurement apparatus, in accordance with examples discussed herein.

FIG. 1C is a conceptual top view diagram illustrating example magnetic field measurement apparatus 112, in accordance with examples discussed herein. First magnetic field sensor 114A includes a first read head 118A and a third read head 118C, and second magnetic field sensor 114B may include a second read head 118B and a fourth read head 118D (referred to individually as "read head 118" and collectively as "read heads 118"); however, in other examples, magnetic field sensors 114 may include only a single read head 118 each. First read head 118A and second read head 118B may be separated by a displacement 122. In some examples, first read head 118A and second read head 118B may be relatively close to each other (e.g., in one housing/assembly), such that displacement 122 is small. For example, the sensors may be built into a same physical unit, such that the spacing and alignment of read heads 118 may be very accurately controlled through manufacturing of the magnetic field measurement apparatus 112, rather than relying on multiple sensors being installed accurately. As will be described further in FIG. 1E, displacement 122 may be selected so that at least one magnetic field sensor 114 detects a magnetically recorded transition of the clock pattern for each clock cycle (e.g., movement of substrate 102 for one element spacing).

As illustrated in FIG. 1C, first magnetic field sensor 114A and second magnetic field sensor 114B may be connected by a connecting member 120. Connecting member 120 may stabilize magnetic field sensors 114 relative to each other, such that magnetic field sensors 114 may more easily and/or consistently maintain alignment during movement of substrate 102. For example, in a two-track system having a substrate that includes a separate data track and clock track, a read head may be positioned above each track. Each of these read heads may require independent stabilization to maintain the read heads in alignment with the respective track and with the other read head. In contrast, due to the proximity of magnetic field sensors 114, magnetic field sensors 114 may be connected through connecting member 120 to reduce misalignment compared to two track systems in which the read heads may not be connected or may be separated by large distances.

In the example of FIG. 1C, read heads 118A and 118B may be used to detect a position of substrate 102, while read heads 118C and 118D may be used to detect a direction of movement of substrate 102. For example, read head 118A may detect a magnetically recorded transition. Read head 118C may be positioned a fraction of an element spacing 140 (described in FIG. 1E) from read head 118A, such as 0.25 mm in a 1 mm transition spacing.

Figure 1D:
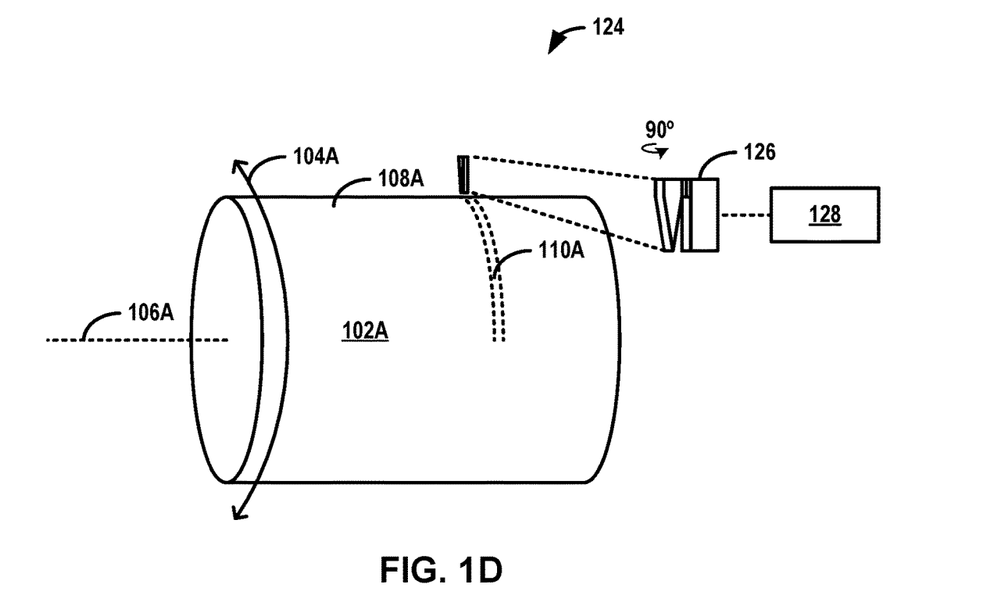
FIG. 1D is a conceptual perspective view diagram illustrating an example system for encoding a magnetic pattern on a substrate, in accordance with examples discussed herein.

FIG. 1D is a conceptual perspective view diagram illustrating an example system 124 for encoding magnetic pattern 110A on substrate 102A of FIG. 1A, in accordance with examples discussed herein. System 124 includes encoding device 126 configured to magnetically record transitions to form magnetic pattern 110A onto surface 108A of substrate 102A. System 124 includes computing device 128. Computing device 128 is configured to encode, using encoding device 126 (illustrated blown up as rotated 90° counterclockwise from a top perspective), surface 108A of substrate 102A with magnetic pattern 110A. Computing device 128 be similar to some examples of computing device 116. For example, computing device 128 may include a variety of processing components including, but not limited to, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, encoding device 126 may be included in system 100A of FIG. 1A, while in other examples, encoding devices 126 may not be included in system 100A once system 100A is deployed. For example, while shown as a separate component, in some examples, computing device 116 and computing device 128 may be a same component.

Figure 1E:
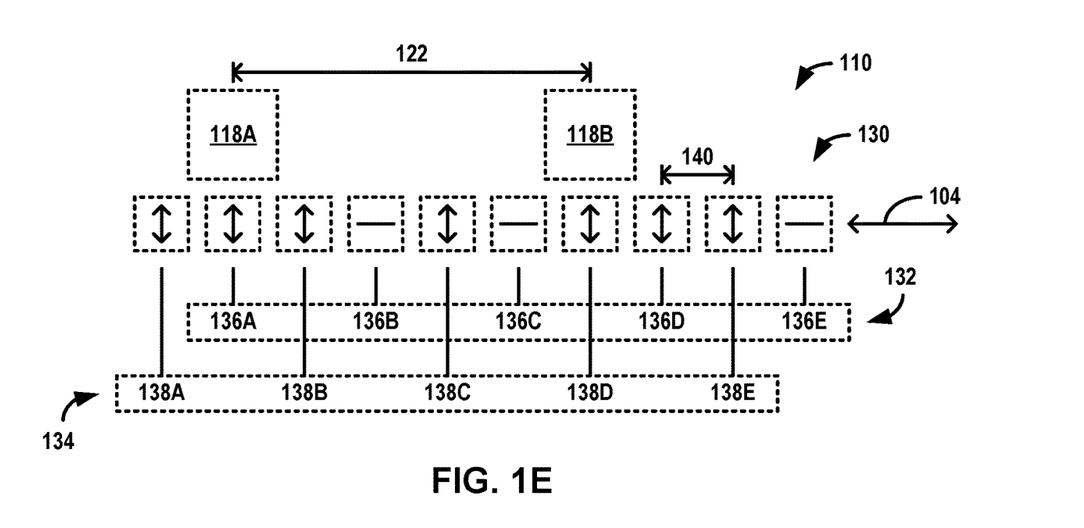
FIG. 1E is a conceptual and schematic block diagram illustrating an example portion of a magnetic pattern, in accordance with examples discussed herein.

FIG. 1E is a conceptual and schematic block diagram illustrating an example portion of a single-track magnetic pattern 110, in accordance with examples discussed herein. Magnetic pattern 110 includes a plurality of elements 130 aligned along direction of movement 104. Each element 130 of the plurality of elements 130 may represent a presence ( ↕ ) or absence (–) of a magnetically recorded transition. The magnetically recorded transitions may be longitudinal, perpendicular, or a combination of both. A first portion of the plurality of elements 130 includes a plurality of data elements 136 defining data pattern 132. A second portion of the plurality of elements 130 includes a plurality of clock elements 138 interleaved with the plurality of data elements 136 and defining clock pattern 134.

A center of each element 130 of the plurality of elements 130 is separated from a center of an adjacent element 130 by an element spacing 140, such as between about 0.1 millimeters and about 10 millimeters. In some examples, data pattern 132 may be offset from clock pattern 134, such that magnetic field sensors 114 may detect magnetically recorded transitions with reduced overlap of magnetic field signals. For example, each data element 136 may be separated from an adjacent data element 136 by a same spacing that each clock element 138 is separated from an adjacent clock element 138; however, an element spacing between a data element 136 and adjacent clock elements 138 may be different.

Magnetic pattern 110 includes data pattern 132. Data pattern 132 is configured to indicate a position of substrate 102 along direction of movement 104. Data pattern 132 may be encoded so that a particular portion of data pattern 132 may correspond to a particular position of substrate 102. For example, in system 100A of FIG. 1A, a particular portion of data pattern 132 of magnetic pattern 110A may correspond to a circumferential position around axis 106A, while in system 100B of FIG. 1B, a particular portion of data pattern 132 of magnetic pattern 110B may correspond to an axial position along axis 106B. As such, the particular portion of data pattern 132 may correspond to a sequence of the plurality of magnetic field signals detected by magnetic field sensors 114 from the portion of data pattern 132. Each data element 136 includes either a magnetically recorded transition or an absence of a magnetically recorded transition. Each data element of the plurality of data elements 136 represents a value. For example, presence of a magnetically recorded transition may indicate a first value ("1"), while absence of a magnetically recorded transition may indicate a second value ("0"). The values of the sequence of the plurality of data elements 136 may indicate the position of substrate 102. A bit length of data pattern 132 may be inversely proportional to element spacing 140 and directly proportional to a length of magnetic pattern 110.

Magnetic pattern 110 includes clock pattern 134. Clock pattern 134 is interleaved and substantially colinear with data pattern 132. Clock pattern 134 is configured to indicate a plurality of clock transitions in which each clock element 138 includes a magnetically recorded transition. For example, as shown in FIG. 1E, each clock element 138 of the plurality of clock elements 138 includes a magnetically recorded transition. As a result, each clock element 138 induces at least one of read heads 118 to generate a magnetic field signal each time a clock element 138 passes beneath the read head 118, such that computing device 116, via one of read heads 118, receives a regular magnetic field signal caused by a clock element 138 every clock cycle.

In some examples, displacement 122 corresponds to a cumulative element spacing 140 of an odd number of elements of the plurality of elements 130. Spacing read heads 118 an odd number of elements apart and including a regular clock pattern 134 alternating with data pattern 132 may ensure that at least one read head 118 will detect a clock element 138 every clock cycle, such that clock pattern 134 will always be available to indicate a potential absence of a magnetically recorded transition every clock cycle. In the example of FIG. 1E, a magnetically recorded transition is present under at least one read head 118 at every possible position in the sequence of magnetic pattern 110. In some examples, read heads 118 may be offset, such that one read head 118 may detect a magnetically recorded transition prior to the other read head 118 detecting a magnetically recorded transition. For example, offsetting either read heads 118 or data pattern 132 and clock pattern 134 may make it easier for computing device 116 to decode data pattern 132, as a magnetically recorded transition on data pattern 132 would not be detected at exactly the same time as a magnetically recorded transition on clock pattern 134. In other words, a state of a data signal representing data pattern 132 will be stable at a position where a signal corresponding to clock pattern 134 transitions and can be cleanly sampled and compared to a last state to see if a magnetically recorded transition has occurred. In some instances, read heads 118 may be offset, such that magnetic pattern 110 may be recorded with uniform element spacing 140 and the offset may be accurately set by the precision-assembled magnetic field measurement unit 112. In other instances, data pattern 132 and clock pattern 134 may be offset, such that the offset may be more easily customized than displacement 122 of read heads 118. In some examples, displacement 122 may be about half a length of m-sequence of data pattern 132. For example, for a 9-bit or 10-bit m-sequence, displacement 122 may be about five element spacings 140.

Data pattern 132 may be encoded using a variety of methods. In some examples, data pattern 132 may be encoded with a non-return to zero inverted (NRZI) encoding. For example, binary '1' may be encoded as a magnetically recorded transition so that a '1' will pass under at least one read head 118 every clock cycle. Data pattern 132 may be interleaved with a minimally long m-sequence with clock pattern 134, ensuring that there is always a transition under at least one head every millimeter.

As an extended example, a data track in a two-track system may use an m-sequence that is only as long as the data track. For example, a substrate that is one meter in circumference and has an element spacing of one millimeter may be encoded with a 10-bit sequence (1023 values, or millimeters, long) and use a clock track to indicate motion having magnetically recorded transitions every millimeter. Rather than use a 10-bit m-sequence to encode a one-meter long substrate, magnetic pattern 110 may use a 9-bit m-sequence (511 values, or millimeters, long) that is equal to or longer than data pattern 132, but shorter than magnetic pattern 110. Magnetic pattern 110 additionally includes a series of "1" values interleaved into the sequence, making magnetic pattern 110 1023 values long, the same as the two-track 10-bit sequence. As a result of the interleaved clock transitions, magnetic pattern 110 guarantees that one read head 118 will read a value ("0" or "1") derived from the m-sequence of data pattern 132 and the other read head 118 will read a value "1" derived from clock pattern 134 that was interleaved with data pattern 132 m-sequence to provide clock data. As such, a "1" is guaranteed to pass under one (e.g., a clock element 138 indicating a "1" and a data element 132 indicating a "0") or both (e.g., a clock element 138 and a data element 136 both indicating a "1") read heads 118 every millimeter of element spacing 140.

Figure 2A:
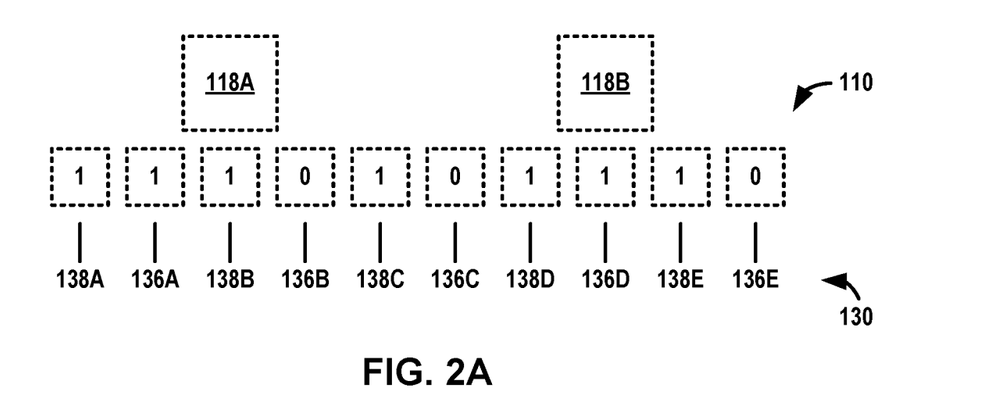
FIG. 2A is a conceptual and schematic block diagram illustrating the example portion of a magnetic pattern of FIG. 1E with read heads at a first position, in accordance with examples discussed herein.
Figure 2B:
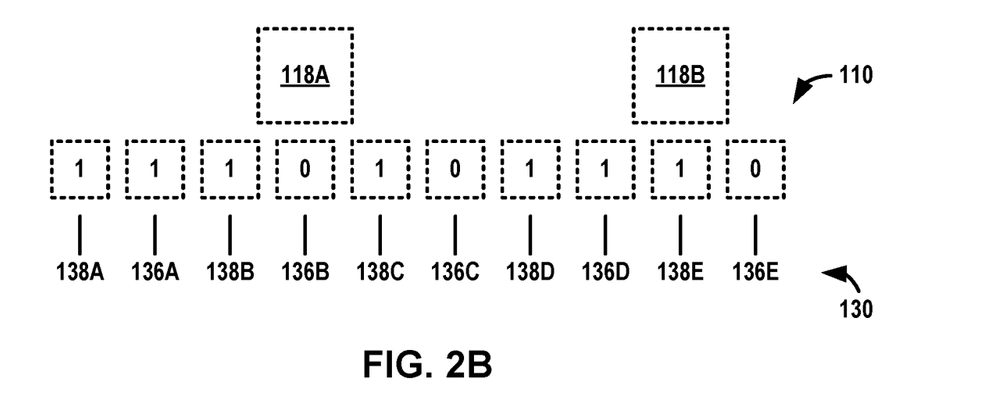
FIG. 2B is a conceptual and schematic block diagram illustrating the example portion of a magnetic pattern of FIG. 1E with read heads at a second position, in accordance with examples discussed herein.

FIGS. 2A and 2B are conceptual and schematic block diagrams illustrating the example single-track magnetic pattern of FIG. 1E with read heads 118 at a first position, as in FIG. 2A, and with read heads 118 at a second position, as in FIG. 2B, in accordance with examples discussed herein. For illustration purposes, the first position of read heads 118 of FIG. 2A and the second position of read heads 118 of FIG. 2B are separated by a single clock cycle corresponding to element spacing 140. Due to the regularity of the plurality of clock elements 138 within magnetic pattern 110 and a displacement 122 of read heads 118, when a first element of the plurality of elements 130 (e.g., clock element 138B in FIG. 2A or data element 136B of FIG. 2B) passes under first read head 118A and a second element of the plurality of elements 130 (e.g., data element 136D in FIG. 2A or clock element 138E of FIG. 2B) passes under second read head 118B due to motion of substrate 102, at least one of the first and the second elements (e.g., clock elements 138B or 138E and data element 136D) will include a magnetically recorded transition under at least one of read heads 118 every element spacing 140 to determine that motion is taking place. For example, at the first position shown in FIG. 2A, first read head 118A detects a magnetically recorded transition at clock element 138B, while at the second position shown in FIG. 2B, second read head 118B detects a magnetically recorded transition at clock element 138E.

Referring back to FIG. 1E, computing device 116 is configured to determine a position of substrate 102 based on a plurality of magnetic field signals received from magnetic field sensors 114. In some examples, computing device 116 may be configured to identify clock pattern 134 and data pattern 132, such as from a cold start, and continue to track clock pattern 134 and data pattern 132 to determine whether a received magnetic field signal corresponds to clock pattern 134 or data pattern 132. Due to the regularity of the plurality of clock elements 138 and the irregularity of the plurality of data elements 136, detection of a magnetically recorded transition corresponding to clock element 138 by one of read heads 118 may provide an indication to computing device 116 that the other of read heads 118 has, is, or will be detecting a presence or absence of a magnetically recorded transition. For example, as shown in FIG. 1E, first read head 118A detects a magnetically recorded transition at data element 136A and second read head 118B detects a magnetically recorded transition at clock element 138D. Computing device 116 may detect a magnetically recorded transition on one read head 118 without a corresponding magnetically recorded transition on the other read head 118, identify the magnetically recorded transition as corresponding to a clock element 138, and identify the absence of the magnetically recorded transition as corresponding to a data element 136, thus identifying clock pattern 134 and data pattern 132.

Computing device 116 may track data pattern 132 and clock pattern 134 as magnetically recorded transitions or absences of magnetically recorded transitions represented as magnetic field signals alternating between read heads 118 and use clock pattern 134 as a regular reference for data pattern 132. Computing device 116 may determine whether a magnetic field signal received from one of magnetic field sensors 114 represents data element 136 or clock element 138. For example, computing device 116 may receive a magnetic field signal from one of magnetic field sensors 114. Based on the identified clock pattern 134 and data pattern 132, computing device 116 may determine whether the received magnetic field signal is a data element 136 or a clock element 138. For example, in a direction of movement 104, each read head 118 may alternate in sensing a data element 136 or a clock element 138. Computing device 116 may track these alternating magnetic field signals to continue to identify data pattern 132 and clock pattern 134.

In response to determining that the received magnetic field signal represents a data element 136, computing device 116 may be configured to determine the value of the data element 136. In some examples, computing device 116 may be configured to determine a presence or absence of a magnetically recorded transition at the corresponding data element 136. To determine the presence of a magnetically recorded transition, computing device 116 may be configured to determine that computing device 116 has received a magnetic field signal from one of magnetic field sensors 114, such as a magnetic field signal that is above a threshold or received within a period of time relative to a preceding clock element 138. Computing device 116 may be configured to determine, based on the presence of a magnetically recorded transition, that the corresponding data element has the first value, such as a "1". To determine the absence of a magnetically recorded transition, computing device 116 may be configured to determine a lack of receipt of a magnetic field signal from second magnetic field sensor 114A, such as a magnetic field signal that is below a threshold. Computing device 116 may be configured to determine, based on the absence of a magnetically recorded transition, that the corresponding data element has the second value, such as a "0".

Computing device 116 may be configured to determine the position of substrate 102 based on values of a portion of data pattern 132 as represented by a sequential portion of the plurality of data elements 136. For example, data pattern 132 may include a pseudorandom sequence of values for which a bit length subsequence may be unique. For an m-sequence bit length, there may be a set of different sequences that can be created, the number of which generally increases as the bit length increases, in which derivation of these sequences may involve computing prime factors of a generator polynomial. For example, for a bit length of 10 bits, there may be thirty unique m-sequences, such that a corresponding data pattern 132 may have an m-sequence. Within the m-sequence of data pattern 132, a sequence of values may be unique to a particular position on data pattern 132, and thus substrate 102. To determine the position of substrate 102, computing device 116 may be configured to decode the portion of data pattern 132. For example, computing device 116 may look up a position of substrate 102 that corresponds to the sequential values of the portion of the plurality of data elements 136. The sequential values of the portion of the plurality of data elements 136 may be an n-bit long sequence of values that represent the position of substrate 102.

In some examples, computing device 116 may be configured to determine a position of substrate 102 from a cold start (i.e., without prior information regarding which elements 130 are clock elements 138). Upon a cold start, computing device 116 may not initially identify a magnetically recorded transition as corresponding to a clock element 138 or a data element 136. Magnetic pattern 110 may be encoded such that computing device 116 may be capable of decoding a portion of magnetic pattern 110 sufficient to determine a position of substrate 102 within a particular number of clock cycles after a cold start. For example, computing device 116 may collect magnetic field signals from both magnetic field sensors 114 at a same time and at two points of the m-sequence of magnetic pattern 110 separated by a head spacing s (corresponding to displacement 122) and an m-sequence length n (corresponding to $2^n$>length of magnetic pattern 110/element spacing 140). For a head spacing s<n, a cold-start acquisition may take up to 2n−s+2 transitions (i.e., 2n−s for the interleaved configuration and magnetic head spacing, then one +1 is because with NRZI the data cannot be decoded until at least one transition has been observed and the other +1 is because motion could start an infinitesimally small distance c past a transition, in which case the substrate would have to move 1−ε before seeing the next transition, and 1−ε converges to 1). In the extended example described above, with n=9, s=5, and 1 mm transitions, a maximum number of clock cycles, and thus distance of travel, of substrate 102 may be 15 millimeters, after which computing device 116 may decode a sufficient number of data elements 136, and thus obtain a sufficient sequence of values, to determine a position of substrate 102.

In some examples, computing device 116 may be configured to determine the position of substrate 102 at increments smaller than element spacing 140. For example, once computing device 116 has identified clock pattern 134, submillimeter position computing device 116 may be configured to determine submillimeter position by alternating back and forth between the read head 118 currently reading a clock transition of clock pattern 134. For example, computing device 116 may detect a zero crossing on clock pattern 134 to detect a clock transition, such as with a 1-millimeter between magnetically recorded clock transitions detecting from clock pattern 134 using alternating read heads 118. In between these 1 mm clock transitions, the signal corresponding to clock pattern 134 may vary sinusoidally. Computing device 116 may receive an analog value of a sinusoid of clock pattern 134 and determine, based on the analog value relative to the clock transition, a position of substrate 102 within the 1 mm increment. For example, computing device 116 may detect that the analog value is approximately zero and determine that substrate 102 has a position corresponding to a respective clock transition. As another example, computing device 116 may detect that the analog value is approximately a peak magnitude and determine that substrate 102 has a position corresponding to halfway to a respective clock signal. In this way, computing device 116 may detect a sub-millimeter position to add to a whole-number millimeter absolute position decoded from clock pattern 134 and data pattern 132. Further detection of sub-millimeter measurements by computing device 116 may be described in U.S. Pat. No. 8,970,208, issued on Mar. 3, 2015, which is incorporated by reference herein in its entirety.

Computing device 116 may be configured to determine direction of movement 104 and a change in direction of movement 104, of substrate 102. For example, clock pattern 134 and data pattern 132 may be offset, such that magnetic field signals induced by the clock pattern 134 and data pattern 132 may be differentiated by a phase relationship (e.g., magnetic field signal from clock pattern 134 detected prior to a magnetic field signal from data pattern 132 in a first direction; magnetic field signal from clock pattern 134 detected after a magnetic field signal from data pattern 132 in a second direction).

In some examples, computing device 116 may be configured to determine a direction of movement using multiple read heads 118. For example, a magnitude of a signal (e.g., positive or negative, which may be arbitrarily chosen) at a first read head 118 relative to a rising or falling transition at a second read head 118 may indicate a direction of movement of substrate 102. As described in FIG. 1C, each magnetic field sensor 114 may include two or more read heads 118. As one example, with respect to magnetic field sensor 114A, computing device 116 may be configured to detect a magnetically recorded transition using read head 118A and, upon detection of the magnetically recorded transition, measure the magnetically recorded using read head 118C. Computing device 116 may detect that the signal from read head 118A is rising and is higher in magnitude than the signal from read head 118C, indicating that substrate 102 is moving in a direction with read head 118A leading read head 118C. Alternatively, computing device 116 may detect that the signal from read head 118A is rising and is lower in magnitude than the signal from read head 118C, indicating that substrate 102 is moving in a direction with read head 118C leading read head 118A. In this way, computing device 116 may quickly determine direction of movement 104 of substrate 102.

Computing device 116 is configured to output the position of substrate 102. For example, computing device 116 may output a signal representing the position of substrate 102 to another computing device, a storage device, a display, or the like. In some examples, computing device 116 may determine other properties of substrate 102 based on the position of substrate 102. For example, computing device 116 may be configured to detect a speed, relative displacement, direction, acceleration, deceleration, or any other property related to a position or change in position of substrate 102.

Figure 3A:
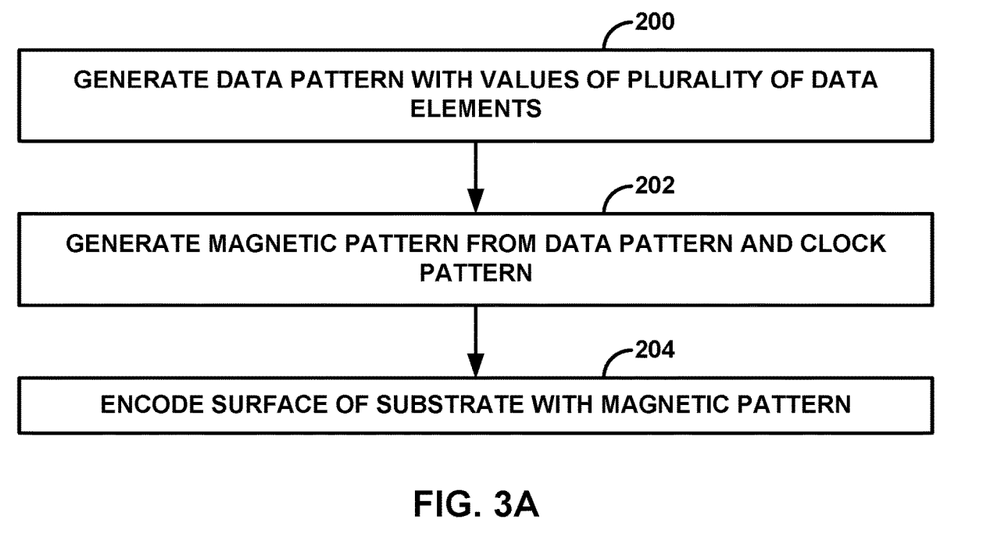
FIG. 3A is a flowchart of an example technique for encoding a single-track magnetic pattern on a substrate, in accordance with examples described herein.
Figure 3B:
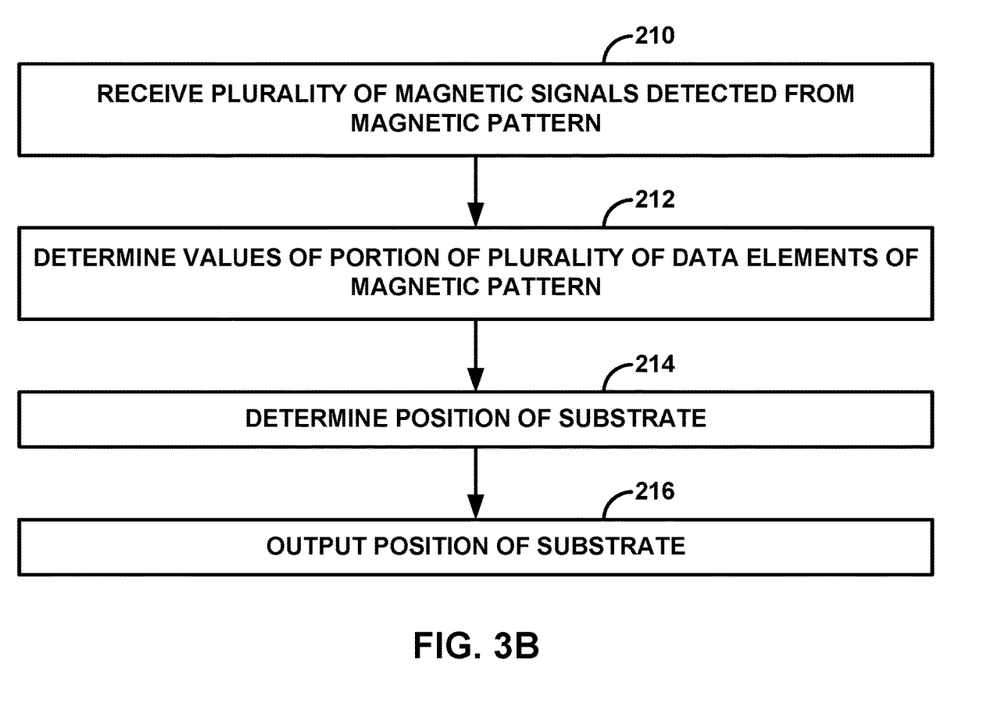
FIG. 3B is a flowchart of an example technique for determining a position of a substrate using a single-track magnetic pattern, in accordance with examples described herein.
Figure 3C:
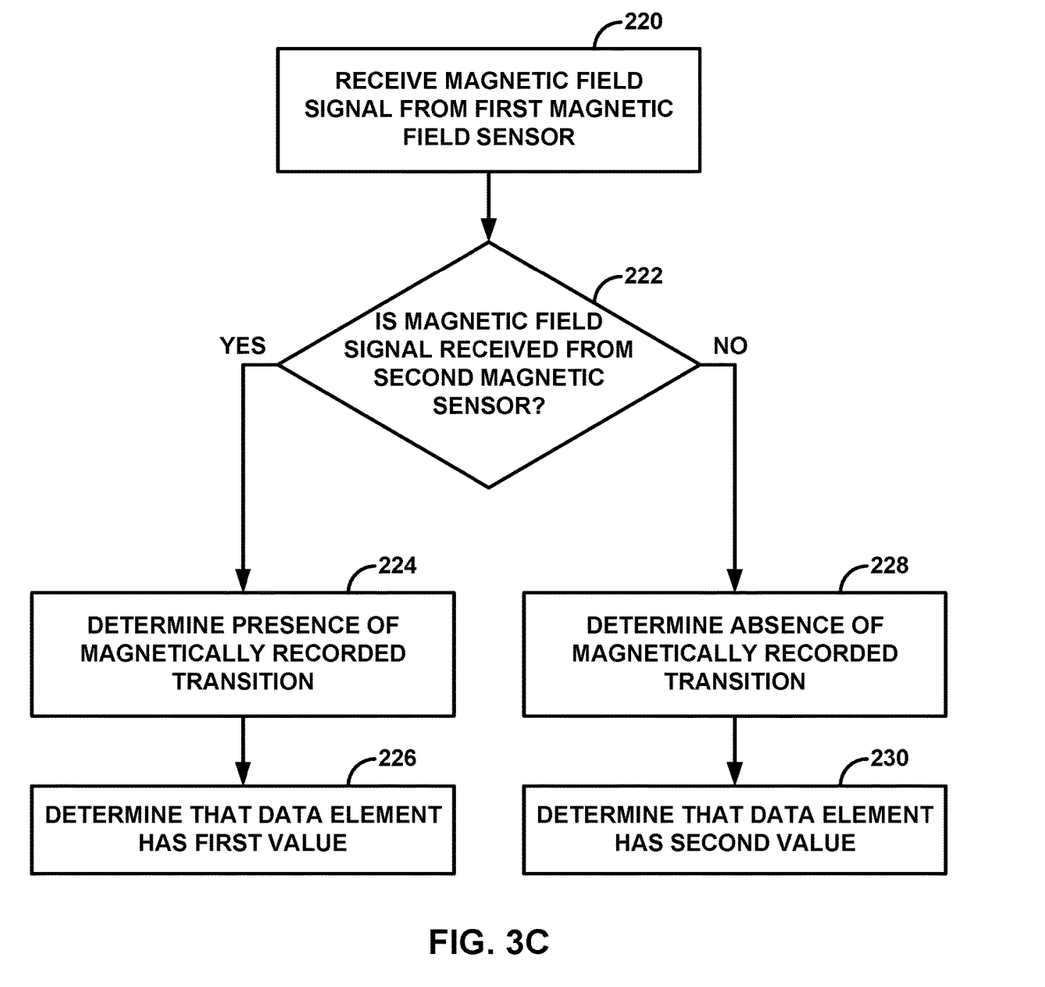
FIG. 3C is a flowchart of an example technique for determining a value of a data element of a single-track magnetic pattern, in accordance with examples described herein.

FIGS. 3A, 3B, and 3C illustrate examples techniques for encoding and decoding position information to and from a substrate. The examples techniques of FIGS. 2A-2C will be described with respect to FIGS. 1A-1E and FIGS. 2A-2B; however, other systems may be used to implement the techniques of FIGS. 3A-3C.

FIG. 3A is a flowchart of an example technique for encoding a single-track magnetic pattern on a substrate, in accordance with examples described herein, and as described with reference to FIGS. 1D and 1E. The example technique of FIG. 3A includes generating, by computing device 116, data pattern 132 from values of the plurality of data elements 136 (200). For example, computing device 116 may use a variety of methods, such as NRZI, to determine values for data elements 136 of data pattern 132. The m-sequence of data pattern 132 may be based on a desired length of magnetic pattern 110 and element spacing 140 of magnetic pattern 110.

The example technique of FIG. 3A includes generating, by computing device 128, magnetic pattern 110 from the plurality of data elements 136 of data pattern 132 and the plurality of clock elements 138 of clock pattern 134 (202). Computing device 128 may determine values for magnetic pattern 110 by interleaving values of clock pattern 134 that correspond to a magnetically recorded transition. As a result, magnetic pattern 110 includes data pattern 132 and clock pattern 134 interleaved and substantially colinear with data pattern 132.

The example technique of FIG. 3A includes encoding, by computing device 128, surface 108 of substrate 102 with magnetic pattern 110 along direction of movement 104 of substrate 102 (204). In some examples, direction of movement 104A of substrate 102A may be movement around axis 106A of substrate 102A, as shown in FIG. 1A, while in other examples, direction of movement 104B of substrate 102B may be movement along axis 106B of substrate 102B, as shown in FIG. 1B. Magnetic pattern 110 includes plurality of data elements 136 defining data pattern 132 and plurality of clock elements 138 defining clock pattern 134. Computing device 128 causes encoding device 126 to magnetize a position on surface 108 corresponding to each clock element 138 of the plurality of clock elements 138 with a magnetically recorded transition at element spacing 140. Computing device 128 causes encoding device 126 to either magnetize a position on surface 108 corresponding to a data element having a first value ("1") with a magnetically recorded transition or refrain from magnetizing a position on surface 108 corresponding to a data element having a second value ("0") with a magnetically recorded transition.

FIG. 3B is a flowchart of an example technique for determining a position of a substrate using a single-track magnetic pattern, in accordance with examples described herein. The example technique of FIG. 3B includes receiving, by computing device 116 and from first magnetic field sensor 114A and second magnetic field sensor 114B positioned above surface 108 of substrate 102, a plurality of magnetic field signals detected from magnetic pattern 110 (210). Surface 108 is encoded with magnetic pattern 110 sequenced along direction of movement 104 of substrate 102. Magnetic pattern 110 includes data pattern 132 indicating a position of substrate 102 along direction of movement 104 and clock pattern 134 interleaved and substantially colinear with data pattern 132 and indicating a plurality of clock transitions.

The example technique of FIG. 3B includes determining, by computing device 116, values of a portion of the plurality of data elements 136 (212), which will be explained further in FIG. 3C. The example technique of FIG. 3B includes determining the position of substrate 102 based on the values of the portion of the plurality of data elements 136 (214). In some examples, determining the position of substrate 102 includes decoding, by computing device 116, a portion of data pattern 132 corresponding to a portion of the plurality of magnetic field signals. The example technique of FIG. 3B includes outputting, by computing device 116, the position of substrate 102 (216).

FIG. 3C is a flowchart of an example technique for determining a value of a data element of a single-track magnetic pattern, in accordance with examples described herein. The example technique of FIG. 3C include receiving, by computing device 116 and from first magnetic field sensor 114A, a magnetic field signal (220). The magnetic field signal corresponds to a clock element 138 of the plurality of clock elements 138. For example, computing device 116 may track clock pattern 134 and determine that the received magnetic field signal corresponds to clock pattern 134. The example technique of FIG. 3C includes determining, by computing device 116 and in response to receiving the magnetic field signal from first magnetic field sensor 114A, a value of a corresponding data element 136 of the plurality of data elements 136. Each data element of the plurality of data elements includes a magnetically recorded transition indicating a first value ("1") for the data element 136 or an absence of a magnetically recorded transition indicating a second value ("0") for the data element 136. Each clock element 138 of the plurality of clock elements 138 includes a magnetically recorded transition. Computing device 116 may determine whether a magnetic field signal was received by second magnetic field sensor 114B (222).

In some examples, determining the presence of a magnetically recorded transition further includes determining a receipt of a magnetic field signal from the second magnetic field sensor that is within a period of time or above a threshold. In response to receiving a magnetic field signal from second magnetic field sensor 114B ("YES"), computing device 116 may determine the presence of a magnetically recorded transition at the corresponding data element 136 (224). Computing device 116 may determine, based on the presence of a magnetically recorded transition, that the corresponding data element 136 has the first value ("1") (226).

In some examples, determining the absence of a magnetically recorded transition includes determining, by the computing device, a lack of receipt of a magnetic field signal from the second magnetic field sensor that is within the period of time or above the threshold. In response to failing to receive a magnetic field signal from second magnetic field sensor 114B, computing device 116 may determine the absence of a magnetically recorded transition at the corresponding data element 136 (228). Computing device 116 may determine, based on the absence of a magnetically recorded transition, that the corresponding data element 136 has the second value ("0") (230).

As previously described in FIG. 1D, example systems for encoding a magnetic pattern on a substrate may include an encoding device, which is illustrated in FIG. 1D as a discrete encoding device 126 positioned above surface 108A of substrate 102A. However, maintaining precise alignment of such discrete encoding devices may be difficult. For example, discrete encoding devices may be supported in only a single direction relative to a substrate.

Figure 4A:
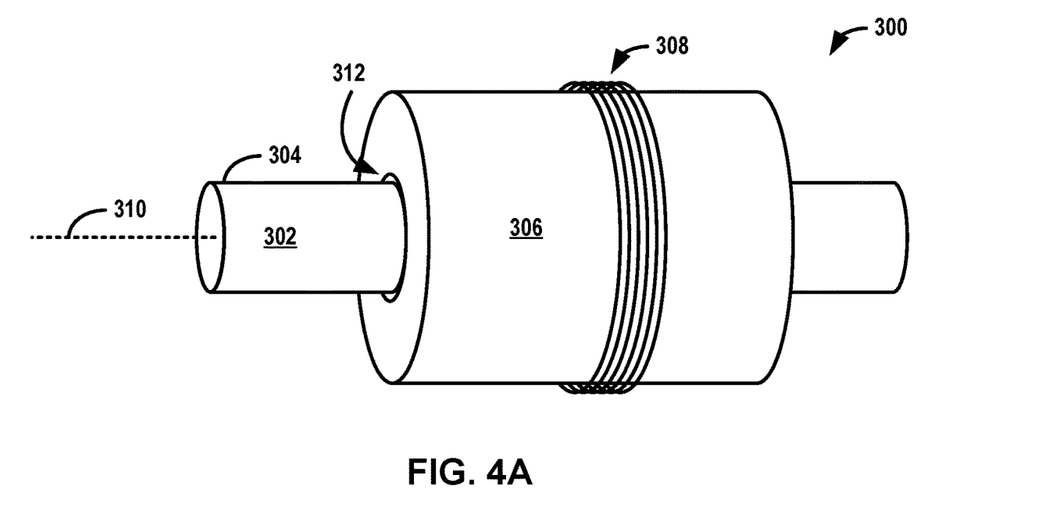
FIG. 4A is a conceptual perspective view diagram illustrating an example system for encoding a magnetic pattern, in accordance with examples discussed herein.

FIG. 4A is a conceptual perspective view diagram illustrating an example system 300 for encoding a magnetic pattern on a substrate 302 that includes a cylindrical write head assembly 306, in accordance with examples discussed herein. System 300 includes a substrate 302 having a surface 304, which may be similar to substrate 102 and surface 104 of FIGS. 1A-1E. Write head assembly 306 includes a plurality of write coils 308 wrapped around write head assembly 306.

Write head assembly 306 may efficiently and uniformly encode a magnetic pattern, such as magnetic pattern 110A of FIG. 1A, into a magnetic layer present on substrate 302. For example, longitudinal recording of magnetically recorded transitions into surfaces may require the use many heads and/or multiple passes and may have a relatively low uniformity. Rather than longitudinally record transitions, write head assembly 306 may be configured to perpendicularly record magnetically recorded transitions into substrate 302.

Write head assembly 306 may utilize a perpendicular head design that may be cylindrically projected about axis 310 of substrate 302. Either or both substrate 302 and/or write head assembly 306 may be configured to rotate around axis 310, such that substrate 302 and write head assembly 306 may move relative to each other. Write head assembly 306 includes a cavity 312 configured to house substrate 302 during encoding of surface 304 of substrate 302. Cavity 312 may be cylindrically symmetrical to constrain substrate 302 within cavity 312, such that write head assembly 306 may relatively uniformly encode a magnetic pattern around a circumference of substrate 302. As such, write head assembly 306 may substantially reduce rotational alignment issues in encoding or installing substrate 302 and may permit use of multiple read heads, such as read heads 118 of FIG. 1C, for redundancy. Write head assembly 306 may be configured to encode the magnetic pattern in one pass and may be easily adapted to different substrate diameters, as will be described further in FIG. 4B below.

Figure 4B:
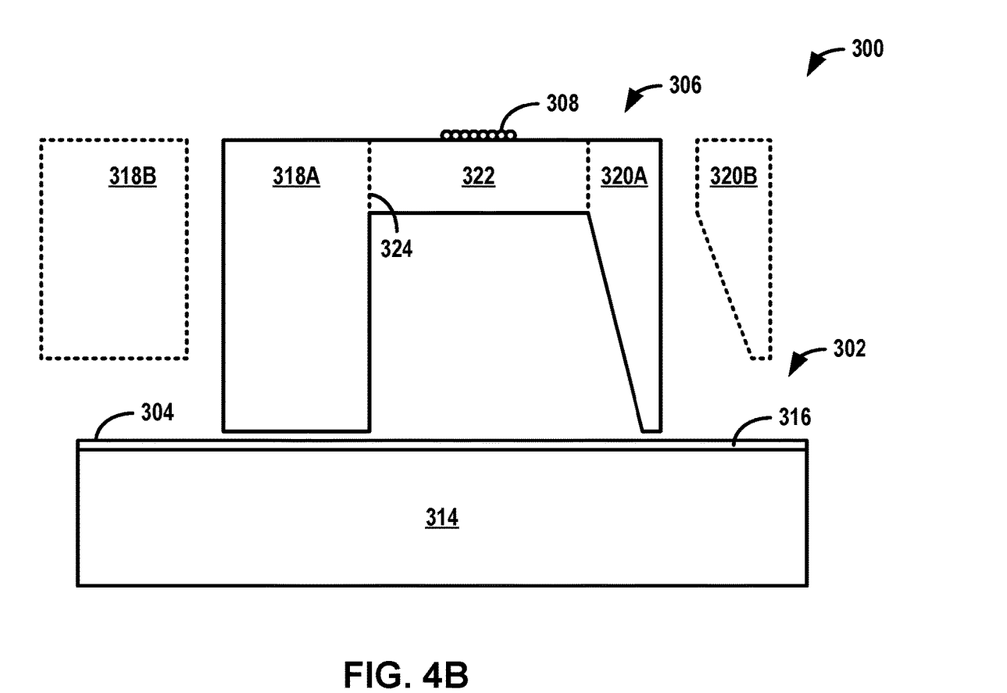
FIG. 4B is a conceptual cross-sectional side view diagram illustrating the example system of FIG. 4A, in accordance with examples discussed herein.

FIG. 4B is a conceptual cross-sectional side view diagram illustrating the example system of FIG. 4A, in accordance with examples discussed herein. Substrate 302 includes a core material 314 and a magnetic recording medium 316. Write head assembly 306 may be configured to encode position measurement information in magnetic recording medium 316 on core material 314, such as steel, in a perpendicular magnetic orientation. Write head assembly includes a main pole 320A (herein, also called a recording pole 320A) and a return pole 318A. Recording pole 320A may be configured to concentrate the magnetic field in a tip region situated closely above or abutting recording medium 316. Recording pole 320A may include a generally triangular side profile that narrows to a tip, but variations to the shape of 320A are also possible In some examples, write head assembly 306 may be made of a unitary piece of ferromagnetic material. However, in other examples, such as illustrated in FIG. 4B, recording pole 320A and return pole 318A may include separable end joints 322 that physically couple to midsection 322 of write head assembly 306. Recording pole 320A and return pole 318A may be replaced with recording pole 320B and return pole 318B to accommodate a substrate 302 have a larger diameter. In this way, recording poles 320A and 320B and return poles 318A and 318B can be manufactured separately from midsection 322 and can be interchanged to accommodate a wide variety of substrate diameters.

In operation, a magnetic field is produced between the recording pole 320A and substrate 302 which may be uniform about the circumference of substrate 302. The plurality of write coils 308 wraps around the midsection of write head assembly 306. The number of turns of the plurality of write coils 308 and the amount of current passed through the turns may be configured to generate a given magnetic flux. Write head assembly 306 may be excited using the plurality of wire coils 308 externally wrapped around the circumference of write head assembly 306. When energized, magnetic flux circulates in a loop formed by write head assembly and substrate 302. An electrical current may flow through such write coils 308, energize write head assembly 306, and generate a magnetic field sufficient to saturate magnetic recording medium 316 and induce magnetic domains in magnetic recording medium 316 to align perpendicularly as write head assembly 306 moves relative to substrate 302. In general, the amount of current required to produce the desired magnetic field strength depends on the geometry of substrate 302 (e.g., flat, curved, etc.). Although shown to be wrapped around midsection 322, other embodiments of write head assembly 306 can have the plurality of write coils 308 wrapped around recording pole 320A and/or return pole 318A.

What is claimed is:

1. A system, comprising:
a substrate having a surface encoded with a magnetic pattern sequenced along a direction of movement of the substrate, wherein the magnetic pattern comprises a plurality of elements, wherein a first portion of the plurality of elements comprises a plurality of data elements defining a data pattern indicating a position of the substrate along the direction of movement, wherein a second portion of the plurality of elements comprises a plurality of clock elements interleaved with the plurality of data elements and defining a clock pattern indicating a plurality of clock transitions, wherein each data element comprises one of a magnetically recorded transition indicating a first value for the data element or an absence of a magnetically recorded transition indicating a second value for the data element, and wherein the plurality of data elements includes at least one data element comprising an absence of a magnetically recorded transition;
a first magnetic field sensor and a second magnetic field sensor positioned above the magnetic pattern; and
a computing device communicatively coupled to the first and second magnetic field sensors and configured to:
receive, from the first and second magnetic field sensors, a plurality of magnetic field signals detected from the magnetic pattern;
determine, based on the plurality of magnetic field signals, the position of the substrate; and
output the position of the substrate.

2. The system of claim 1, wherein to determine the position of the substrate, the computing device is further configured to decode a portion of the data pattern corresponding to a portion of the plurality of magnetic field signals detected from the portion of the data pattern.

3. The system of claim 1, wherein the direction of movement of the substrate comprises at least one of movement around an axis of the substrate or movement along an axis of the substrate.

4. The system of claim 1, wherein to determine the position of the substrate, the computing device is further configured to:
determine values of a portion of the plurality of data elements; and
determine the position of the substrate based on the values of the portion of the plurality of data elements.

5. The system of claim 1,
wherein a center of each element of the plurality of elements is separated from a center of an adjacent element by an element spacing, and
wherein a first read head of the first magnetic field sensor and a second read head of the second magnetic field sensor are separated by a displacement corresponding to a cumulative element spacing of an odd number of elements of the plurality of elements.

6. The system of claim 1, wherein each clock element comprises a magnetically recorded transition.

7. The system of claim 6,
wherein the plurality of magnetic field signals comprises a magnetic field signal corresponding to a clock element of the plurality of clock elements, and
wherein the computing device is further configured to determine, in response to receiving the magnetic field signal from the first magnetic field sensor, a value of a corresponding data element of the plurality of data elements.

8. The system of claim 7, wherein to determine the value of the corresponding data element, the computing device is further configured to:
determine, in response to receiving the magnetic field signal, a presence or absence of a magnetically recorded transition at the corresponding data element;
determine, based on the presence of a magnetically recorded transition, that the corresponding data element has the first value; and
determine, based on the absence of a magnetically recorded transition, that the corresponding data element has the second value.

9. The system of claim 8,
wherein to determine the presence of a magnetically recorded transition, the computing device is configured to determine a receipt of a magnetic field signal from the second magnetic field sensor that is above a threshold, and
wherein to determine the absence of a magnetically recorded transition, the computing device is configured to determine a lack of receipt of a magnetic field signal from the second magnetic field sensor that is above the threshold.

10. A method for determining a position of a substrate along a direction of movement of the substrate, comprising:
receiving, by a computing device and from a first magnetic field sensor and a second magnetic field sensor positioned above a surface of the substrate, a plurality of magnetic field signals detected from a magnetic pattern, wherein the surface is encoded with the magnetic pattern sequenced along the direction of movement of the substrate, and wherein the magnetic pattern comprises a plurality of elements, wherein a first portion of the plurality of elements comprises a plurality of data elements defining a data pattern indicating a position of the substrate along the direction of movement, wherein a second portion of the plurality of elements comprises a plurality of clock elements interleaved with the plurality of data elements and defining a clock pattern indicating a plurality of clock transitions, wherein each data element comprises one of a magnetically recorded transition indicating a first value for the data element or an absence of a magnetically recorded transition indicating a second value for the data element, and wherein the plurality of data elements includes at least one data element comprising an absence of a magnetically recorded transition;
determining, by the computing device and based on the plurality of magnetic field signals, the position of the substrate; and
outputting, by the computing device, the position of the substrate.

11. The method of claim 10, wherein determining the position of the substrate further comprises decoding, by the computing device, a portion of the data pattern corresponding to a portion of the plurality of magnetic field signals.

12. The method of claim 10, wherein the direction of movement of the substrate comprises at least one of movement around an axis of the substrate or movement along an axis of the substrate.

13. The method of claim 10, wherein determining the position of the substrate further comprises:
 determining values of a portion of the plurality of data elements; and
 determining the position of the substrate based on the values of the portion of the plurality of data elements.

14. The method of claim 10,
 wherein a center of each element of the plurality of elements is separated from a center of an adjacent element by an element spacing, and
 wherein a first read head of the first magnetic field sensor and a second read head of the second magnetic field sensor are separated by a displacement corresponding to a cumulative element spacing of an odd number of elements of the plurality of elements.

15. The method of claim 10, wherein each clock element comprises a magnetically recorded transition.

16. The method of claim 10,
 wherein the plurality of magnetic field signals comprises a magnetic field signal corresponding to a clock element of the plurality of clock elements, and
 wherein the method further comprises determining, by the computing device and in response to receiving the magnetic field signal from the first magnetic field sensor, a value of a corresponding data element of the plurality of data elements.

17. The method of claim 16, wherein determining the value of the corresponding data element further comprises:
 determining, by the computing device and in response to receiving the magnetic field signal, a presence of a magnetically recorded transition at the corresponding data element; and
 determining, by the computing device and based on the presence of a magnetically recorded transition, that the corresponding data element has the first value.

18. The method of claim 17, wherein determining the presence of a magnetically recorded transition further comprises determining, by the computing device, a receipt of a magnetic field signal from the second magnetic field sensor that is above a threshold.

19. The method of claim 16, wherein determining the value of the corresponding data element further comprises:
 determining, by the computing device and in response to receiving the magnetic field signal, an absence of a magnetically recorded transition at the corresponding data element; and
 determining, by the computing device and based on the absence of a magnetically recorded transition, that the corresponding data element has the second value.

20. The method of claim 19, wherein determining the absence of a magnetically recorded transition further comprises determining, by the computing device, a lack of receipt of a magnetic field signal from the second magnetic field sensor that is above a threshold.

21. A method for indicating a position of a substrate along a direction of movement of the substrate, comprising:
 encoding, by a computing device, a surface of the substrate with a magnetic pattern, wherein the magnetic pattern comprises a plurality of elements,
 wherein a first portion of the plurality of elements comprises a plurality of data elements defining a data pattern indicating the position of the substrate along the direction of movement of the substrate,
 wherein a second portion of the plurality of elements comprises a plurality of clock elements interleaved with the plurality of data elements and defining a clock pattern indicating a plurality of clock transitions,
 wherein each data element comprises one of a magnetically recorded transition indicating a first value for the data element or an absence of a magnetically recorded transition indicating a second value for the data element, and
 wherein the plurality of data elements includes at least one data element comprising an absence of a magnetically recorded transition.

22. The method of claim 21, wherein the direction of movement of the substrate comprises at least one of movement around an axis of the substrate or movement along an axis of the substrate.

23. The method of claim 21, wherein a center of each element of the plurality of elements is separated from a center of an adjacent element of the plurality of elements by an element spacing that is between about 0.1 millimeters and about 10 millimeters.

24. The method of claim 21, wherein each clock element comprises a magnetically recorded transition.

25. The method of claim 21, further comprising:
 generating, by the computing device, the data pattern from values of the plurality of data elements; and
 generating, by the computing device, the magnetic pattern from data elements of the data pattern and interleaved clock elements of the clock pattern.

* * * * *